J. F. BEATTY.
FUNNEL.
APPLICATION FILED JAN. 7, 1909.
936,511.　　　　　　　　　　　　Patented Oct. 12, 1909.
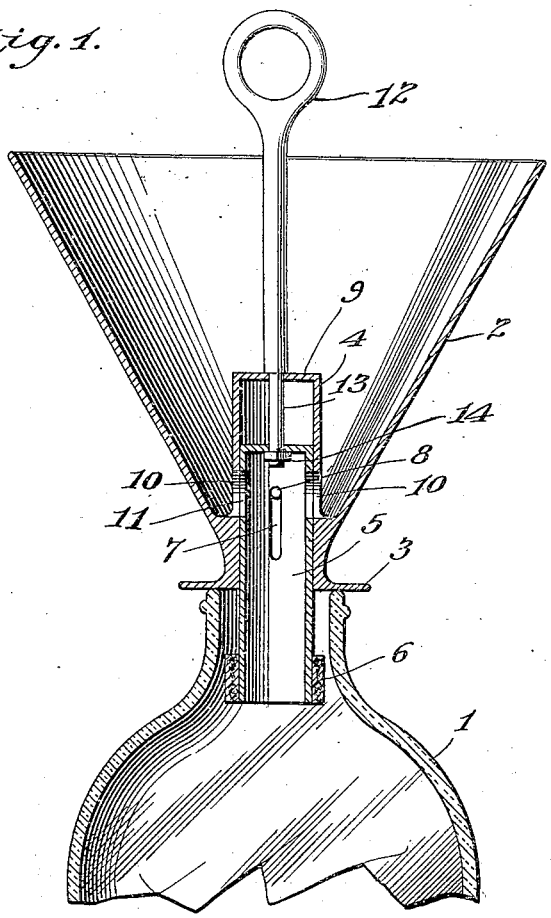
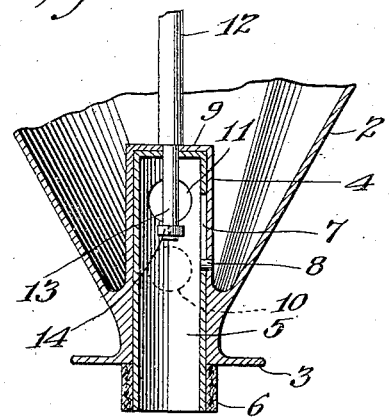
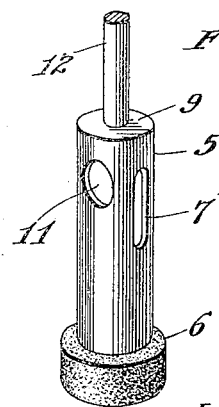
Witnesses
M. C. Lyddane
J. A. L. Mulhall
Inventor
John F. Beatty
By Joshua R. H. Potts
Attorney

UNITED STATES PATENT OFFICE.

JOHN F. BEATTY, OF MORTON, PENNSYLVANIA.

FUNNEL.

936,511. Specification of Letters Patent. Patented Oct. 12, 1909.

Application filed January 7, 1909. Serial No. 471,130.

*To all whom it may concern:*

Be it known that I, JOHN F. BEATTY, a citizen of the United States, residing at Morton, in the county of Delaware and State of Pennsylvania, have invented certain new and useful Improvements in Funnels, of which the following is a specification.

My invention relates to improvements in funnels, the object of the invention being to provide a funnel which in position and in operation on a bottle or other receptacle to be filled, will automatically close to prevent overflowing of the bottle, leaving sufficient room in the bottle for the reception of a cork or stopper, and which can be carried from one receptacle to another without danger of spilling the contents of the funnel, and which will automatically open to discharge its contents into an empty bottle when placed thereon.

With these and other objects in view, the invention consists in certain novel features of construction, and combinations, and arrangements of parts as will be more fully hereinafter described and pointed out in the claims.

In the accompanying drawings, Figure 1, is a view in longitudinal section illustrating my improvements. Fig. 2, is a fragmentary view showing the position of the parts when the funnel automatically closes. Fig. 3, is a detail perspective view of the tubular plunger and float.

1 represents a bottle, and 2 my improved funnel having a flat bottom portion 3, to rest on top of the bottle and support the funnel in position thereon. The funnel is provided at its center with a vertical tubular casing 4, and a tubular plunger 5 is mounted to move in said casing 4, and provided around its lower open end with a cork ring 6, thus constituting a float. This plunger 5 is made with a longitudinal slot 7, into which a pin 8, on casing 4 projects, to limit the downward movement of the plunger, the upward movement of the plunger being limited by the closed top 9 of casing 4. The casing 4, at opposite sides, is provided with openings 10, which latter when the plunger is down, register with similar openings 11 in the plunger, so that the contents of the funnel can freely pass through the openings 10 and 11, and down through the plunger 5 into the receptacle.

When the receptacle or bottle fills and the liquid reaches the level of the float 6, the latter will be raised by the liquid to raise the plunger 5, and move the openings 11 out of register with the openings 10, and hence prevent the passage of any liquid from the funnel into the plunger, and as this float will shut off the liquid before the receptacle is entirely filled, sufficient room will be left in the receptacle for the reception of a cork or stopper.

12 represents the handle which is provided with a reduced lower end 13, projecting through alined openings in the casing top 9, and the top of plunger 5, and provided with a nut 14 on its lower end. This handle 12 does not interfere with the upward movement of the plunger 5, but when the funnel is to be lifted by means of this handle, the first upward pull on the handle will cause the nut 14 to engage the plunger 5, and hold it in elevated or closed position, while the funnel is supported by the handle, hence permitting the funnel to be moved from place to place without loss of liquid therefrom, and when it is placed upon another receptacle, and the handle released, the plunger will fall, by gravity, to open the funnel and allow the contents to pass into a new receptacle.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. In a funnel, the combination with a central tubular casing, of a tubular plunger movable in said casing, said plunger and casing having openings which register when the plunger is in its lowest position, and a float on said plunger.

2. In a funnel, the combination with a central vertical tubular casing, of a tubular plunger mounted to move in said casing, and having a slot therein, a pin in the casing projecting into the slot and limiting the downward movement of the plunger, said casing and plunger having openings which register when the plunger is in its lowest position, a ring of buoyant material around the lower end of said tubular plunger, a handle projecting through the upper ends of the casing, and the plunger, and a nut on the lower end of said handle.

In testimony whereof I have signed my name to this specification in the presence of two subscribing witnesses.

JOHN F. BEATTY.

Witnesses:
R. H. KREUKEL,
J. A. L. MULHALL.